United States Patent [19]

Henrich

[11] 4,033,434
[45] July 5, 1977

[54] SELF ADJUSTING BRAKE SYSTEM

[75] Inventor: Helmut Henrich, Burbach-Niederdresselndorf, Germany

[73] Assignee: Firma Siegerland-Bremsen, Haiger-Rodenbach, Germany

[22] Filed: Feb. 26, 1976

[21] Appl. No.: 661,753

[30] Foreign Application Priority Data

Feb. 26, 1975 Germany .......................... 2508240

[52] U.S. Cl. .............................. 188/75; 188/79.5 K; 188/171; 188/196 B
[51] Int. Cl.² .......................................... F16D 49/16
[58] Field of Search ........ 188/75, 79.5 GE, 79.5 K, 188/79.5 S, 79.5 R, 79.5 GC, 170, 171, 173, 196 B, 196 BA, 196 V, 196 D, 71.9; 192/90

[56] References Cited
UNITED STATES PATENTS

| | | |
|---|---|---|
| 2,747,698 | 5/1956 | Currie ........................ 188/196 B X |
| 3,348,639 | 10/1967 | Ames et al. ..................... 188/75 X |
| 3,782,511 | 1/1974 | Parfitt ......................... 188/196 D X |

*Primary Examiner*—Trygve M. Blix
*Assistant Examiner*—Douglas C. Butler
*Attorney, Agent, or Firm*—Edmund M. Jaskiewicz

[57] ABSTRACT

A pair of brake levers each having a brake shoe thereon acting in opposite directions against a brake drum have one end pivotally mounted and the other end of one brake lever is pivotally connected to a pivotally mounted operating lever. A rod is pivotally connected between the other brake lever and the operating lever. The operating lever is moved in the non-braking direction by an actuator and a spring pivots the operating lever in the other direction to apply the brake shoes. The end of the rod pivotally connected to the operating lever has a uni-directional drive thereon to adjust the effective length of the rod only when the operating lever is moved in the non-braking direction to compensate for wear of the brake shoes.

9 Claims, 3 Drawing Figures

SELF ADJUSTING BRAKE SYSTEM

The present invention relates to a brake system of the external brake shoe type, more particularly, to a resetting device to compensate for wear of the brake shoes in such a brake system.

An external brake shoe brake system, such as might be employed on vehicles or rotating members including various types of machinery, generally comprises a pair of brake shoes acting in opposed relationship upon a brake drum. The brake shoes are mounted upon brake levers which are pivotally connected to an operating lever. The operating lever is pivoted into the braking direction by a spring and in the non-braking direction by a suitable actuating device which may be pneumatic, hydraulic or electric.

Upon wear of the brake shoes, a considerable play or clearance will exist in the brake linkage interconnecting the brake levers with the operating lever. This play decreases the effectiveness of the brake system since in some cases considerable movement of the operating lever must occur before any movement of the brake shoes occurs in either the braking or non-braking directions. It has therefore been proposed to provide a resetting device on the operating lever in order to compensate for any wear of the brake shoes. Such a resetting device has comprised a uni-directional gear or drive operable by pivoting movement of the operating lever in either direction to reset the effective length of the brake linkage.

Such a known resetting device provided a continuous resetting which theoretically corresponded to the wear of the brake linings and occurred after every braking operation. The magnitude of the resetting was adjustable but it was necessary to calculate or determine this resetting through tests.

It is therefore a principal object of the present invention to provide an improved resetting device for such a brake system as described above.

It is another object of the present invention to provide such a resetting device which resets automatically as a function of the actual magnitude of wear of the brake linings on the brake shoes.

The present invention utilizes the pivoting movement of the operating lever which connects the actuating device, the brake spring and the brake levers and which pivots between the braking and non-braking positions. During lifting of the brake into the non-braking position the operating lever is pivoted into a definite normal or starting position but when the brake linings are worn the operating lever must pivot through a greater angle for the purpose of braking than when the brake linings are not worn. The present invention provides a pair of cam members on the operating lever between which is moveable an actuating lever of a uni-directional drive on the rod connecting one of the brake levers to the operating lever. The cams are spaced apart a sufficient distance so that when the lining is not worn the actuating lever will be free to move and only make bare contact with the cams. Upon wear of the brake linings, the cams will abut against the actuating lever and will displace this lever in either direction. In one direction of displacement there will be no resetting of the brake linkage since the uni-directional drive is free to rotate in this one direction without any effect on the length of the rod. However, displacement of the actuating lever in the other direction will actuate the drive means to adjust the effective length of the connecting rod between the brake lever and the operating lever. This adjusting operation will occur with the lifting of the brake to the release position.

Other objects and advantages of the present invention will be apparent upon reference to the accompanying description when taken in conjunction with the following drawings wherein.

Proceeding next to the drawings wherein like reference symbols indicate the same parts throughout the various views, a specific embodiment and modifications of the present invention will be described in detail.

Figure 1:
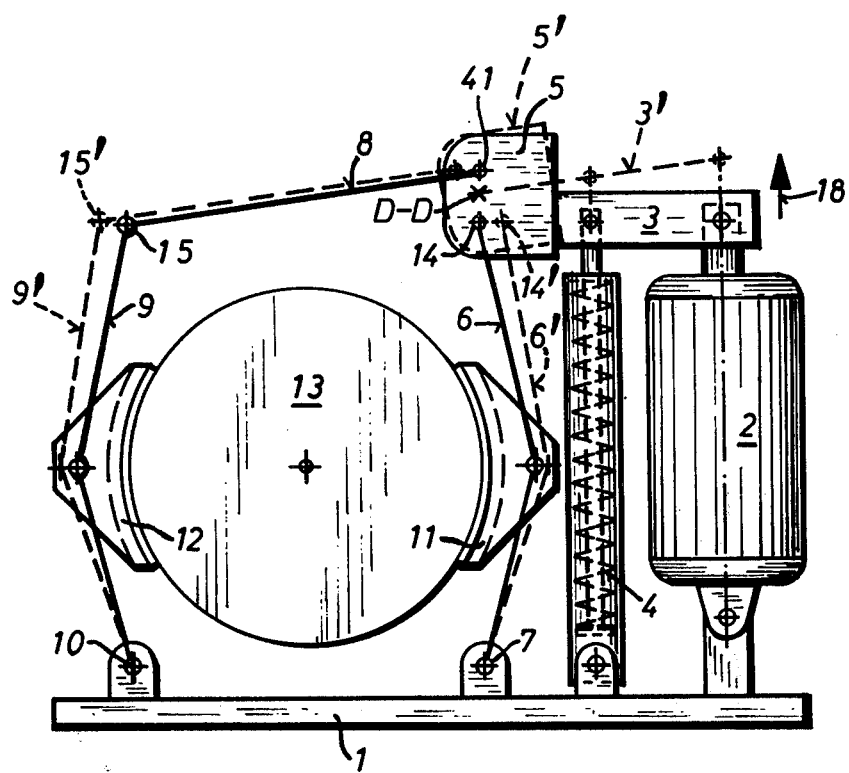
FIG. 1 is a schematic representation in elevation of an external brake system incorporating the resetting device of the present invention.

As may be seen in FIG. 1, a lifting or actuating device 2 is pivotally mounted upon a base plate 1 and has a movable member which may be an armature or piston rod which is pivotally connected to an operating lever 3. The other end of the operating lever is attached to the lower portion of a forked or bi-furcated element 5 such that the element 5 and attached operating lever 3 form an angular lever.

A brake spring 4 is connected in parallel with the lifting device 2 and similarly has one end connected to the base plate 1 and the other end pivotally connected to operating lever 3. A spring 4 maintains the operating lever in the position as shown in FIG. 1 in which position the brake shoes are applied. Energization of the lifting device 2 moves the operating lever in the direction of arrow 18 into an initial or release position as indicated at 3'. In the position 3' of the operating lever the spring 4 is under tension.

A first brake lever 6 has one end pivotally mounted on a pin 7 on the base plate 4 and the other end pivotally mounted by a pin 14 to the fork member 5. A second brake lever 9 has one end pivotally mounted at 10 to the base plate 1 and the other end pivotally connected at 15 to a connecting rod 8 whose other end is threaded and connected to the forked element 5. The brake lever 6 is provided with a brake shoe 11 and the brake lever 9 with a brake shoe 12 which act in opposite relationship against a brake drum or disc 13.

When operating rod 3 is pivoted into the position 3', the forked member 5 will pivot about an axis D—D which is located perpendicular to the plane of the drawing as seen in FIG. 1. In this position, brake lever 6 is pivoted to the position 6' and brake lever 9 to the position 9'. During this described movement of the brake levers, the brake shoes 11 and 12 are lifted from and disengaged from the brake drum 13. Upon the energization of the lifting device 2, the brake spring 4 will pull the operating lever 3 from its initial position 3' into the position as illustrated by the solid lines in FIG. 1 and the brake shoes 11 and 12 will be applied against the brake drum 13. The initial or release position 3' will not vary upon wear of the brake linings on the brake shoes 11 and 12.

Upon significant wear of the brake linings, the brake shoes and the brake levers must move a greater distance from their initial position to the braking position.

Under these circumstances, the angular lever 3,5 will pivot through a larger angle.

Figure 2:
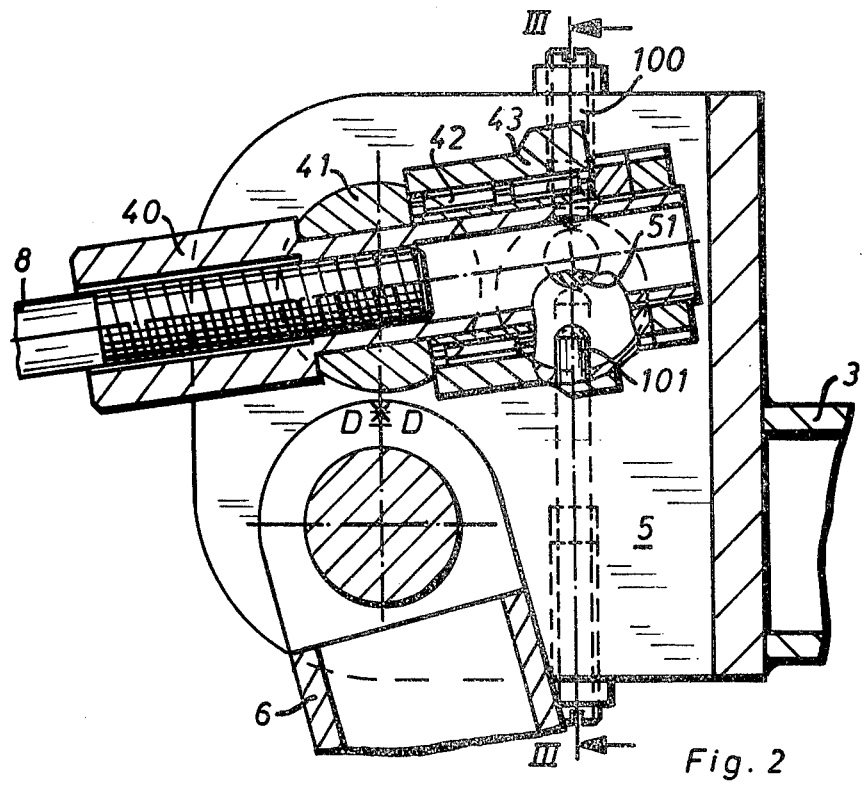
FIG. 2 is a longitudinal sectional view in enlarged scale through one end of the operating lever of FIG. 1 showing details of construction of the present invention; and, FIG. 3 is a sectional view taken along the line III—III of FIG. 2.

The end of the rod 8 as shown in FIG. 2 is threaded and has threaded thereon a sleeve 40 which is rotatably received in a pin 41 mounted in the opposed arms of the bi-furcated member 5 so as to pivotally connect this threaded end 8 of the rod within the member 5. A second sleeve 43 is rotatably mounted adjacent one end of the sleeve 40 as may be seen in FIG. 2 and is drivingly connected to the sleeve 40 by means of a uni-directional drive 42 which, as known in the art, may comprise a suitable ratchet and drive uni-directional drive element. With this arrangement, rotation of the sleeve 43 in on direction will rotate the sleeve 40 through the uni-directional drive 42 while rotation of the sleeve 43 in the other direction will have no effect upon the sleeve 40 and the sleeve 43 will rotate freely in this direction.

Extending radially from the sleeve 43 is an actuating lever 51 which extends into a bore 200 formed in one arm of the forked element 5. A pair of adjustable screws 100 and 101 are mounted in this arm of the forked element 5 and extend into the bore 200 so as to present cam surfaces which are engagable by the actuating lever 51.

When the operating lever 3 is lifted into its initial position 3', the pivot pins 14 and 15 of the brake lever 6 and threaded rod 8 are pivoted into the positions 14' and 15' as shown in FIG. 1. The intermediate or forked member 5 will pivot into position 5' and this pivoting movement will cause the adjusting screw 100 to engage the actuating lever 51 to pivot the sleeve 43 about the longitudinal axis of the rod 8. This rotary movement of the sleeve 43 occuring when the operating lever is moving to its release position will rotate the sleeve 40 through the uni-directional drive 42 to increase the effective length of the rod 8. As a result, the brake levers 6 and 9 will be reset in response to the magnitude of wear of the brake linings.

Figure 3:
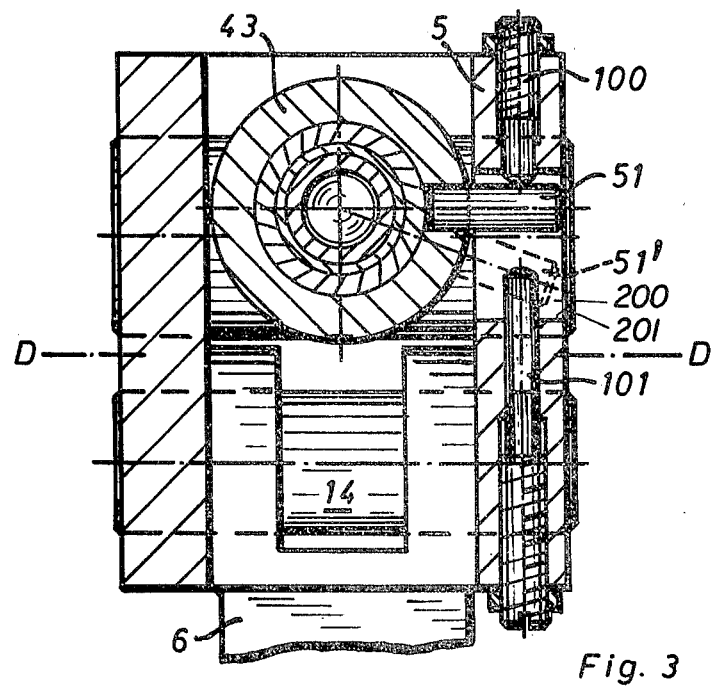

In the initial position 3' of operating lever 3, the screw 101 will just barely contact pin 51 as indicated by the dashed lines in FIG. 2. In the braking position, which occurs when the operating lever 3 is pivoted downwardly and the brake linings are applied in brake relationship to the brake drum 13, the screw 100 will barely contact actuating lever or pin 51 on the other side as shown in FIGS. 2 and 3.

After wear occurs in the brake lining, the operating lever 3 will pivot further downwardly than when in the non-worn state of the brake linings. As a result, the screw 100 will press against the actuating pin 51 and swing th pin downwardly into position 51' as shown in FIG. 3. This pivoting movement will be absorbed by the uni-directional 42 and there will be no re-setting of the brake linkage. However, if during release of the brake the operating lever is shifted back into its initial position 3' the screw 101 will abut against actuating lever 51 and move the lever upwardly into its position as shown in the solid lines in the drawings. This upward movement of the actuating lever 51 and the resultant rotary movement of sleeve 43 will be transmitted by the uni-directional drive 42 to the sleeve 40 which will then adjust the effective length of the rod 8.

While the present embodiment has been described with two cams 100 and 101 arranged in opposite relationship in one arm of the fork member 5, it is pointed out that as a modification the pin 101 can be omitted. The bore 200 is preferably then positioned such that its lower edge 201 will perform the function previously performed by the cam 101.

As a further modification it is possible to also omit the upper cam 100 such that pivoting movement of the actuating lever 51 is performed by the edges of the bore 200. However, with this modification there is no possibility of adjustment since the edges of the bore 200 remain fixed. However, this modification performs effectively to bring about a resetting of the linkage to compensate for brake shoe wear.

It is apparent that the resetting device according to the present invention is effective only when there is actual wear in the brake linings of the brake shoes. The resetting device will not have any effect and will not operate when there is no or negligible wear in the brake linings. However, the resetting device will adjust the positioning of the brake shoes precisely corresponding to and in response to the magnitude of the wear of the brake linings.

It will be understood that this invention is susceptible to modification in order to adapt it to different usages and conditions, and accordingly, it is desired to comprehend such modifications within this invention as may fall within the scope of appended claims.

What is claimed is:

1. A brake system comprising a pivotally mounted operating lever, first and second brake levers each having a brake shoe thereon acting in opposed relationship against a brake drum and having one end thereof pivotally mounted, the other end of said first brake lever being pivotally connected to said operating lever and rod means pivotally connected between the other end of said second brake lever and said operating lever such that pivoting of said operating lever in one direction applies said brake shoes and pivoting in the other direction releases said brake shoes, means connected to said operating lever for actuating said operating lever in the non-braking direction, spring means acting to pivot said operating lever to apply said brake shoes, and means on said rod means and operating lever for adjusting the length of said rod means when said operating lever is moved in one direction in response to wear of said brake shoes, said adjusting means comprising uni-directional drive means on said rod means at its end connected to said operating lever such that rotation of said drive means in one direction increases the effective length of said rod means, an actuating lever extending from said drive means, and first and second opposed cams on said operating lever engageable with said drive means actuating lever upon pivoting of said operating lever.

2. A brake system as claimed in claim 1 wherein said drive means actuating lever is pivotable about the longitudinal axis of said rod means.

3. A brake system as claimed in claim 1 wherein said cams are positioned on said operating lever such that pivoting of said operating lever between braking and non-braking positions when said brake shoes are not worn said drive means actuating lever will merely contact said cams, said cams engaging and moving said actuating lever in both directions when said brake shoes are worn.

4. A brake system as claimed in claim 3 wherein the length of said rod means is adjusted only when said operating lever is moved in the non-braking direction.

5. A brake system as claimed in claim 1 wherein said actuating lever comprises a radially extending pin.

6. A brake system as claimed in claim 1 wherein said cams comprise a pair of adjustable screws.

7. A brake system as claimed in claim 1 wherein said operating lever comprises a forked portion having spaced arms between which said rod means is pivotally connected, there being an opening in one of said arms and said actuating lever projecting into said opening, said cams mounted in said one arm and extending into said opening.

8. A brake system as claimed in claim 1 wherein said operating lever comprising a forked portion having spaced arms between which said rod means is pivotally connected, there being an opening in one of said arms and said actuating lever projecting into said opening, said first cam being mounted in said one arm and extending into said opening to be engageable by said actuating lever upon pivoting of said operating lever in one direction, said second cam comprising an edge at said opening, said actuating lever engageable with said second cam upon pivoting of said operating lever in the other direction.

9. A brake system as claimed in claim 1 wherein there is an opening in one of said arms and said actuating lever projecting into said opening, said first and second cams comprising edges at said opening, said actuating lever engageable with said opposed edges of said opening upon pivoting of said operating lever.

* * * * *